Sept. 1, 1953  M. MARQUARDT  2,650,469
MANUFACTURE OF FLEXIBLE CHAINS
Filed Sept. 24, 1948  2 Sheets-Sheet 1
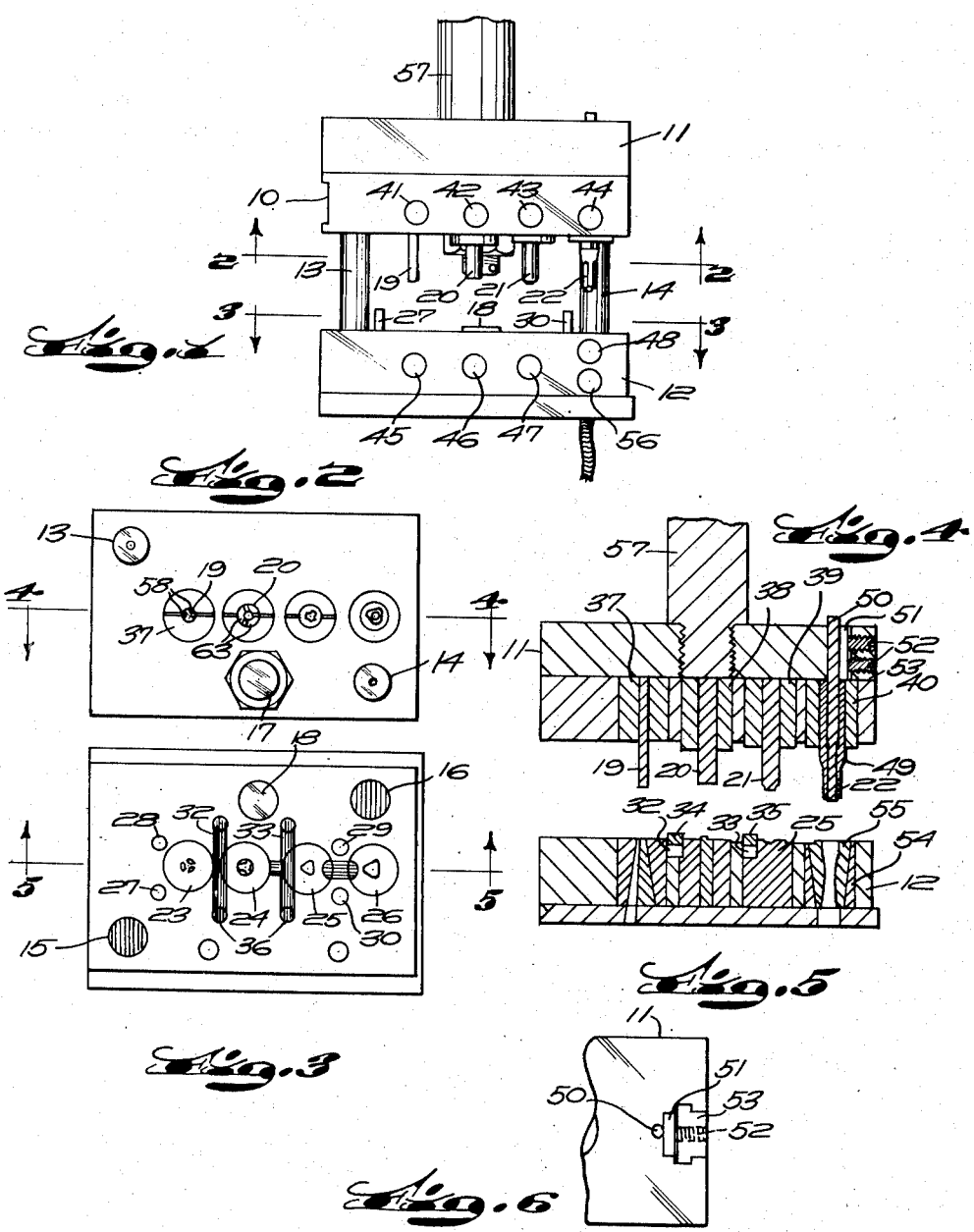
INVENTOR.
Max Marquardt
BY Nathaniel Frucht
Attorney

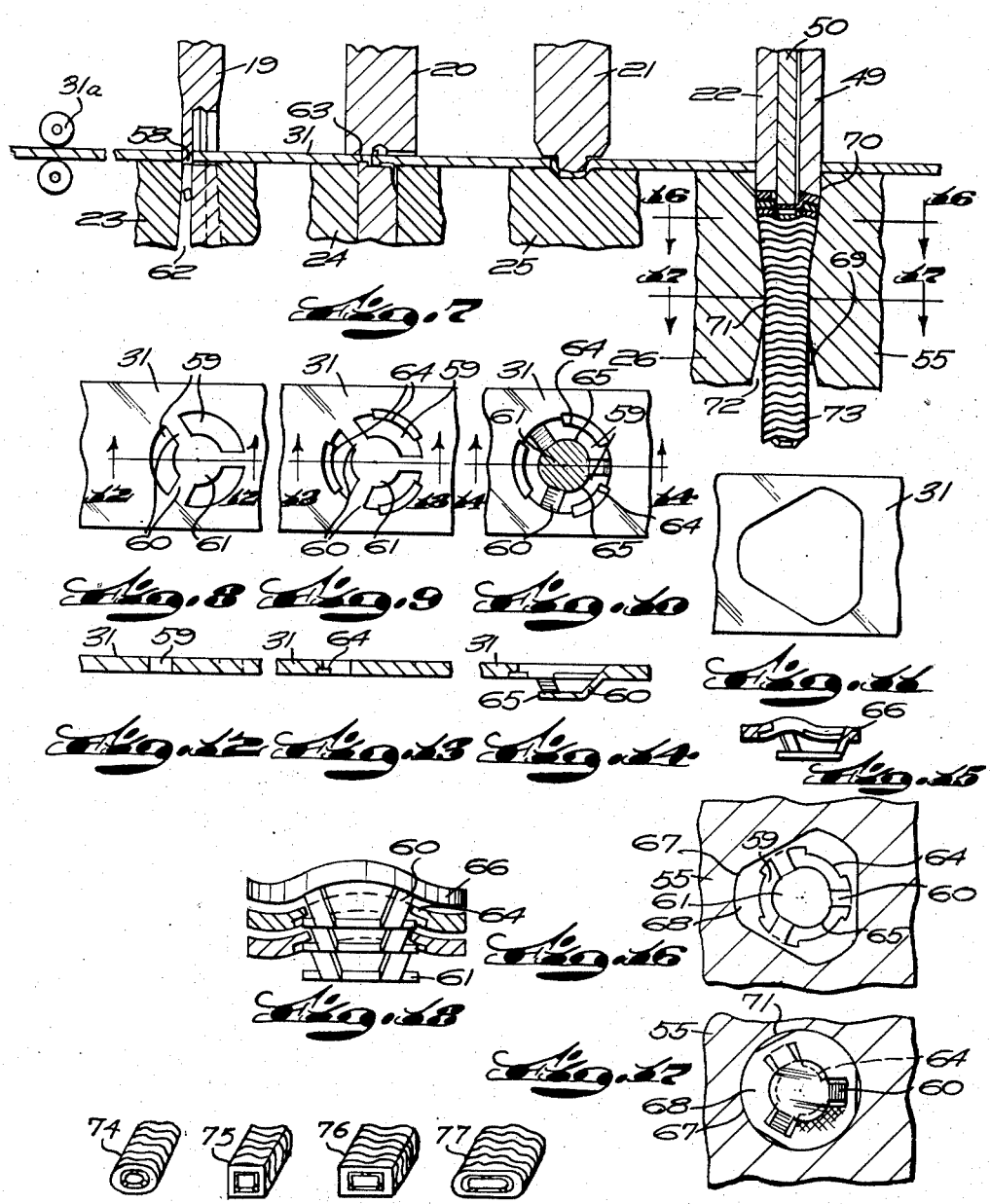

Patented Sept. 1, 1953

2,650,469

UNITED STATES PATENT OFFICE 2,650,469

MANUFACTURE OF FLEXIBLE CHAINS

Max Marquardt, East Greenwich, R. I.

Application September 24, 1948, Serial No. 51,055

14 Claims. (Cl. 59—14)

The present invention relates to the manufacture of ornamental chains, and has particular reference to the manufacture of flexible snake chains.

The principal object of the invention is to provide a gang tool for stamping and assembling snake chain, whereby speed of operation is greatly increased and cost of operation is reduced.

Another object of the invention is to provide a simplified mechanical assembly for stamped out snake chain parts.

A further object is to manufacture a snake chain with stamped out elements of special shape which are successively interlocked with preceding elements and successively interlock with succeeding elements.

With the above and other advantages and objects in view, the invention consists of a novel method of manufacture, a novel apparatus, and a novel product, more fully disclosed in the detailed description following, and more specifically defined in the claims appended thereto.

In the drawings,

Fig. 1 is a plan view of the novel gang tool;

Fig. 2 is a bottom view of the upper tool;

Fig. 3 is a top view of the lower tool;

Fig. 4 is a vertical section on the line 4—4 of Fig. 2;

Fig. 5 is a vertical section on the line 5—5 of Fig. 3;

Fig. 6 is a partial top view of the right end of Fig. 4.

Fig. 7 is an enlarged sectional detail showing the down stroke of the upper tool;

Fig. 8 is an enlarged bottom view detail of the first stamping;

Fig. 9 is an enlarged bottom view detail of the second stamping;

Fig. 10 is an enlarged bottom view detail of the third stamping;

Fig. 11 is an enlarged bottom view detail of the cut out stamping;

Fig. 12 is a section on the line 12—12 of Fig. 8;

Fig. 13 is a section on the line 13—13 of Fig. 9;

Fig. 14 is a section on the line 14—14 of Fig. 10;

Fig. 15 is a transverse section of the chain link blank;

Fig. 16 is a bottom plan view of the chain link blank as it appears when in the position indicated by the line 16—16 of Fig. 7;

Fig. 17 is an enlarged section showing a chain link on the line 17—17 of Fig. 7;

Fig. 18 is an enlarged side view of three assembled links, partly in section; and Figs. 19, 20, 21, and 22 are perspective views of modified constructions of snake chains having different shapes.

It has been found desirable to manufacture flexible chain of the snake chain type by stamping and forming, in order to simplify the apparatus required and to eliminate need for extremely small tolerances such as have been heretofore required for commercial manufacture. To this end, I have devised a stamping and forming operation, which stamps out a special form of link blank, and then assembles the chain by forming each link blank into a chain link while simultaneously flexibly locking each chain link to the preceding chain link. The resulting chain is thus made of successive links, each of which is flexibly interlocked to the preceding link and flexibly interlocks with the next link, whereby an extremely strong snake chain results, made up of identical chain links.

Referring to the drawings, the gang tool 10 includes an upper tool 11 and a lower tool 12, the upper tool having spaced guide standards 13, 14 which slidably seat in openings 15, 16 of the lower tool. The upper tool is also provided with an adjustable stop pin 17 adapted to contact a stop abutment 18 on the lower tool, to provide proper spacing.

A series of stamps 19, 20, 21, and 22 are mounted in linear alignment in the upper tool to depend therefrom, and a series of hardened seats 23, 24, 25 and 26 are positioned in linear alignment to co-operate with the stamps of the upper tool. The lower tool also has sets of spaced guide pins 27, 28 and 29, 30, for guiding a metal strip 31, see Fig. 8, therebetween, and is provided with two spaced recesses 32, 33 in which spring pressed metal blocks 34, 35 are seated to extend across the width of the metal strip and to press upwardly to ensure disengagement of the metal strip from the die seats. The springs for the metal blocks 34, 35 are preferably seated in bores 36 at the ends of the recesses 32, 33.

The stamps 19, 20, 21, and 22 of the upper tool are preferably set in bushings 37, 38, 39, and 40 which are locked in place by standard lock screws in side openings 41, 42, 43 and 44. The bushings 23, 24, 25 and 26 are similarly locked in place by lock screws threaded in openings 45, 46, 47 and 48.

Referring now to Figs. 4, 5 and 6, it will be noted that the stamp 22 is a multiple stamp, having an outer core 49 which is for the purpose of imparting a slight dip or angularity to the chain link blanks, and a central core 50 which is a push stamp for the purpose of exerting a positive downward thrust on the chain link blanks. The central core 50 is locked in place by a wedge plate 51 and set screws 52 in a tie shaped block 53, whereby the central core may be adjusted to proper length with respect to the outer core 49.

The corresponding lower seat 26 is also in two parts, the outer shell 54 being conical interiorly and being retained in place by the lock screw 48; the inner shell 55 is conical on its outer surface to wedge into the outer shell and is also preferably locked in place, as by a lock screw threaded in an opening 56, see Fig. 1, the outer shell being cut away in the usual manner for this purpose.

Referring now to Figs. 7 to 16, the metal strip 31 is intermittently step by step fed by any suitable means, such as feed rolls 31a, into the gang tool between the guide pins 27, 28, 29 and 30 in timed relation to the reciprocation of the upper tool, which has a standard plunger rod 57 secured thereto for such purpose. The stamps 19, 20, 21, and 22 all operate in unison but act successively on the strip 31 to form the chain link blanks.

Thus, stamp 19 is a cutter stamp, which has three arcuately arranged spaced cutters 58 adapted to cut out three arcuate coaxial annular slots 59 in the metal strip 31 to provide three connecting bars 60 and a center disk 61, the cut out parts exiting through suitable openings 62 in the seat 23. The stamp 20 is a swaging stamp, with three projections 63 adapted to swage the metal on the rims of the arcuate slots 59 to provide reduced width lips 64. The stamp 21 is also a swaging stamp, which forces the center disk 61 to spread out to provide three shoulders 65 extending into the slots 59 towards the lips 64. The intermediate part of the outer peripheral portion of each of the slots, and the center disk, are thus swaged to depress the center disk and to provide inwardly extending lips at the outer slot edges and outwardly extending shoulders at the center disk which are vertically spaced from the inwardly extending lips.

The link blanks are now ready to be cut out and assembled. The composite stamp 26 cuts out the link blank 66, see Figs. 15, 16, which is generally triangular in shape, with a rim 67 having wide portions 68 in radial alignment with the lips 64 and the shoulders 65, the edge portion of the blank being slightly bent or shaped by the outer section 49 of the stamp 22, and the central portion of the blank being pressed down by the inner core 50 to press the central disk 61 of the blank down. The inner shell 55 is provided with an opening 69 which has its upper portion 70 of the same size and shape as the blank 66 to receive the blank; the upper portion 69 gradually contracts to a central circular position 71 and a flaring exit portion 72, whereby as each blank is pressed down the rim is squeezed in to press the lips 64 above the shoulders 65 of the following link, see Fig. 18, which shows joined links in exaggerated separated relation to disclose the linkage interlocking. The resulting chain 73 is thus made of a plurality of interlocked chain links which are connected to provide a regulated looseness produced by a selected length for the link connecting bars 60, the preferred length being very slightly greater than the rim thickness of each link. It is preferred to form the links so that there is a little clearance in the rim adjacent the link bars 60, see Fig. 17, to reduce the pressure required for interlocking.

The above described method of forming and interlocking, and the apparatus therefor, thus provide a novel flexible snake chain which is made up of one type of link. If desired, chains of any size and of any exterior shape, such as illustrated in Fig. 18, which shows an oval type 74, Fig. 19, which shows a square type 75, Fig. 20, which is a rectangular type 76, and Fig. 21, which is an extended oval type 77, may be readily made by suitably forming the link rims and the interlocking plunger stamp and its co-operating shaping bushing.

The manufacture of an improved snake chain is thus readily accomplished by using one form of link which includes in itself both male and female elements which respectively interlock with the female elements of the preceding link and to the male elements of the next succeeding link. The method of forming each link thus includes a blanking out of a series of slots in annular form to provide a center disk and spaced bars forming ribs between the slots. The center disk is then depressed below the level of the strip, and the disk is formed with outwardly extending shoulders and the outer edges of the slots are formed with inwardly extending lips, which are above the shoulders to provide the desired axial clearance for receiving the interlocking lips. Preferably, the lips and the shoulders are of reduced thickness, about half of the strip thickness, so that the total thickness of the interlocked lips and shoulders is about the same as the thickness of the link rim, whereby the links fit snugly together, the slight spacing between links being sufficient to provide the desired flexibility. The resulting chain is very strong, as the lips and shoulders are of substantial thickness and both are of narrow width. The necessary apparatus for forming the snake chain includes a stamping die to cut the initial annular slots, a swaging die or dies to depress the center disk and to form the lips and the shoulders, a blanking die to cut out the blank, and form the link rim of the proper varying widths, and a plunger die and block to push each link blank into and through a forming and shaping passageway to squeeze and press the lip bearing rim portions inwardly, it being preferred to slightly curve the blank rim and slightly incline the lips, see Fig. 15, and thus increase the flexibility of the interlocked parts.

Although I have disclosed a specific constructional embodiment of an apparatus for manufacturing the snake chain of the invention, and have described a novel procedure for forming the links and for obtaining the desired interlocking it is obvious that changes in the steps of manufacturing, in the size, design, and arrangement of the parts of the apparatus, and in the size and shape of the resulting snake chain and its links, may be made to suit the requirements for different snake chain designs, without departing from the spirit and the scope of the invention as defined in the appended claims.

I claim:

1. In the manufacture of snake chains, the steps of cutting coaxial annular spaced slots in a strip to provide a center disk and radial bars, swaging an intermediate part of the outer peripheral portion of each of said slots and the center disk to depress the center portion and to form inwardly extending lips from the strip material at the outer slot edges and outwardly extending shoulders from the disk material at the inner slot edges, cutting out the slotted portion of the strip to provide a rim around the slots, whereby a link blank results, positioning the link blanks successively in superimposed relation, and pressing the rims of each blank inwardly at the slot areas to interlock its lips with the disk shoulders of the following link blank.

2. In the manufacture of snake chains, the steps of cutting coaxial annular spaced slots in a strip to provide a center disk and radial bars, swaging an intermediate part of the outer peripheral portion of each of said slots and the center disk to depress the center portion and to form inwardly extending lips from the strip material at the outer slot edges and outwardly extending shoulders from the disk material at the inner slot edges, cutting out the slotted portion of the strip to provide a rim around the slots, said rim having wider widths adjacent the slots and narrower widths adjacent the bars, whereby a link blank results, positioning the link blanks successively in superimposed relation, and pressing the rims of each blank inwardly at the slot areas to interlock its lips with the disk shoulders of the following link blank.

3. In the manufacture of snake chains, the steps of cutting coaxial annular spaced slots in annular alignment in a strip to provide a circular center portion and radial bars, swaging an intermediate part of the outer peripheral portion of each of said slots and the center disk to depress the center portion and to form inwardly extending lips from the strip material of reduced thickness at the outer slot edges and outwardly extending shoulders of reduced thickness from the disk at the inner slot edge, the depression of the center portion being of a height to permit flexible interlocking of another set of lips with the disk shoulders, cutting out the slotted portion of the strip to provide a rim around the slots, whereby a link blank results, said rim being generally triangular to provide wider widths adjacent the slots and narrower widths adjacent the ribs, positioning the blanks successively in superimposed relation, and pressing the rims of each blank inwardly at the slot areas to interlock its rim lips with the disk shoulders of the following link blank.

4. A flexible snake chain comprising links each having a rim and a depressed center disk connected to the rim with spaced ribs, said rim having inwardly extending lips between the ribs and said disk having outwardly extending shoulders between the ribs, said lips and shoulders being in spaced relation, the lips of each link being interlocked with the shoulders of the next link.

5. A flexible snake chain comprising links each having a generally circular rim and a depressed generally circular center disk connected to the rim with spaced ribs, said rim having inwardly extending lips between the ribs and said disk having outwardly extending shoulders between the ribs, said lips and shoulders being in spaced relation, the lips of each link being interlocked with the shoulders of the next link.

6. A flexible snake chain comprising links each having a rim and a depressed center disk connected to the rim with spaced ribs, said rim having inwardly extending lips between the ribs and said disk having outwardly extending shoulders between the ribs, said lips and shoulders being of reduced thickness and in spaced relation, the lips of each link being interlocked with the shoulders of the next link.

7. A flexible snake chain comprising links each having a generally circular rim and a depressed generally circular center disk connected to the rim with spaced ribs, said rim having inwardly extending lips between the ribs and said disk having outwardly extending shoulders between the ribs, said lips and shoulders being of reduced thickness and in spaced relation, the lips of each link being interlocked with the shoulders of the next link.

8. A link for a flexible chain, having a rim, a depressed central disk connected to the rim with spaced ribs, the rim having inwardly extending lips between the ribs and the disk outwardly extending shoulders between the ribs, said lips and shoulders being in spaced relation.

9. A link for a flexible chain, having a rim, a depressed central disk connected to the rim with spaced ribs, the rim having inwardly extending lips between the ribs and the disk outwardly extending shoulders between the ribs, said lips and shoulders being of reduced thickness and in spaced relation.

10. Apparatus for the manufacture of snake chain from a strip of sheet metal, comprising an upper tool and a lower tool, the upper tool being reciprocable towards the lower tool, said upper tool having a series of stamps and said lower tool a series of seats for cooperation therewith, said stamps including a cutter for cutting coaxial annular slots and a center disk in the strip, swaging dies for swaging an intermediate part of the outer peripheral portion of each of the slots and the center disk to form inwardly extending lips on the slot peripheral portions and outwardly extending shoulders on the center disk and depressing the center disk, a cutter to cut out a link blank comprising the swaged part and an annular rim therefor and to press the link through a shaping former seat in cooperation therewith, said shaping former seat having a constricting portion for successively pressing each link blank rim inwardly at the slot areas between the rim and the center disk to interlock its inwardly extending lips with the center disk shoulders of the following link blank, and mechanism for feeding portions of said metal strip step by step between operations of said upper and lower tools to each of said stamps and their seats successively for successive operations thereon.

11. In an apparatus for the manufacture of snake chain from a strip of metal, means for cutting coaxial annular slots and a center disk in the strip, means for swaging an intermediate part of the outer peripheral portion of each of the slots and the center disks to depress the center disk and form inwardly extending lips at the outer slot edges and outwardly extending shoulders at the center disk, means for cutting out links comprising the swaged part and annular rims therefor, means for superimposing the blanks successively, means for forcing the rim of each blank inwardly to interlock its lips with the shoulders of the following blank, and mechanism for feeding portions of said metal strip step by step between operations of said means to each of said means successively for successive operations thereon.

12. In an apparatus for the manufacture of snake chain from a strip of metal, means for cutting coaxial annular slots and a center disk in the strip, means for swaging an intermediate part of the outer peripheral portion of each of the slots and the center disk to depress the center disk and form inwardly extending lips of reduced thickness at the outer slot edges and outwardly extending shoulders of reduced thickness at the center disk, means for cutting out links comprising the swaged part and annular rims therefor, means for superimposing the blanks successively, means for forcing the rim of each blank inwardly to interlock its lips with the shoulders of the following blank, and mechanism for feeding portions of said metal strip step by step between operations of said means to each of said means successively for successive operations thereon.

13. In an apparatus for the manufacture of snake chain from a strip of metal, means for cutting coaxial annular slots and a center disk in the strip, means for swaging an intermediate part of the outer peripheral portion of each of the slots and the center disk to depress the center disk and form inwardly extending lips at the outer slot edges and outwardly extending shoulders at the center disk, means for cutting out links comprising the swaged part and annular rims of generally triangular form with wide portions adjacent the slots therefor, means for superimposing the blanks successively, means for forcing the rim of each blank inwardly into generally circular form to interlock its lips with the shoulders of the following blank, and mechanism for feeding portions of said metal strip step by step between operations of said means to each of said means successively for successive operations thereon.

14. In an apparatus for the manufacture of snake chain from a strip of metal, means for cutting coaxial annular slots and a center disk in the strip, means for swaging an intermediate part of the outer peripheral portion of each of the slots and the center disk to depress the center disk and form inwardly extending lips of reduced thickness at the outer slot edges and outwardly extending shoulders of reduced thickness at the center disk, means for cutting out links comprising the swaged part and annular rims of generally triangular form with wide portions adjacent the slots thereof, means for superimposing the blanks successively, means for forcing the rim of each blank inwardly into generally circular form to interlock its lips with the shoulders of the following blank, and mechanism for feeding portions of said metal strip step by step between operations of said means to each of said means successively for successive operations thereon.

MAX MARQUARDT.

References Cited in the file of this patent

UNITED STATES PATENTS

| Number | Name | Date |
|---|---|---|
| 1,856,940 | Alvera et al. | May 3, 1932 |
| 2,366,960 | England | Jan. 9, 1945 |